United States Patent
Gomez et al.

(10) Patent No.: US 10,513,210 B2
(45) Date of Patent: Dec. 24, 2019

(54) RETRACTABLE SEAT CONTROL INTERFACE ASSEMBLY AND VEHICLE SEAT WITH RETRACTABLE SEAT CONTROL INTERFACE

(71) Applicant: Adient Engineering and IP GmbH, Burscheid (DE)

(72) Inventors: John Gomez, Howell, MI (US); Kurt Seibold, Farmington Hills, MI (US); Mark Milner, Bingham Farms, MI (US); Jeff Laho, Brighton, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 34 days.

(21) Appl. No.: 15/846,733

(22) Filed: Dec. 19, 2017

(65) Prior Publication Data

US 2019/0184877 A1    Jun. 20, 2019

(51) Int. Cl.
*B60N 2/75* (2018.01)
*B60N 2/20* (2006.01)

(52) U.S. Cl.
CPC ............ *B60N 2/797* (2018.02); *B60N 2/20* (2013.01); *B60N 2/793* (2018.02)

(58) Field of Classification Search
CPC .......... B60N 2/797; B60N 2/793; B60N 2/20; B60N 2/0296
See application file for complete search history.

(56) References Cited

U.S. PATENT DOCUMENTS

| 4,244,623 | A | * | 1/1981 | Hall | A47C 1/03 297/411.36 |
| 5,076,524 | A | * | 12/1991 | Reh | B60N 2/79 248/296.1 |
| 5,374,104 | A | * | 12/1994 | Moore | A47C 7/72 297/188.16 |
| 6,220,658 | B1 | * | 4/2001 | Lukawski | A47C 7/70 297/145 |
| 6,746,065 | B1 | * | 6/2004 | Chan | B60R 11/0235 296/24.34 |
| 9,617,001 | B2 | * | 4/2017 | Zimmermann | B64D 11/00153 |
| 10,144,327 | B2 | * | 12/2018 | Harris | B60N 3/001 |

(Continued)

FOREIGN PATENT DOCUMENTS

FR    1758322    *   9/2017

*Primary Examiner* — Philip F Gabler
(74) *Attorney, Agent, or Firm* — McGlew and Tuttle, P.C.

(57) ABSTRACT

A retractable interface assembly includes a base member defining a track and a track follower support member engaging the track and moving along the track between a retracted position and an extended position. A viewing angle detent mechanism pivotably connects an interface panel to the track follower support member and defines a plurality of angular positions of the interface panel relative to the track follower support member, including a storage angle position and a full up angle position, to fix the interface panel relative to the track follower support member in one of the plurality of angular positions. A position setting device sets a position of the track follower support member along the track of the base member. The set positions include the retracted position and the extended position of the track follower support member along the track of the base member.

20 Claims, 7 Drawing Sheets

(56) References Cited

U.S. PATENT DOCUMENTS

| | | | |
|---|---|---|---|
| 2006/0219857 A1* | 10/2006 | Satterfield | B60R 11/0235 |
| | | | 248/284.1 |
| 2013/0234949 A1* | 9/2013 | Chornenky | G06F 3/0216 |
| | | | 345/169 |
| 2016/0276865 A1* | 9/2016 | Pike | B60N 2/90 |
| 2018/0304789 A1* | 10/2018 | Robert | B60N 2/797 |
| 2019/0077288 A1* | 3/2019 | Gayon | B60N 2/797 |

* cited by examiner

RETRACTABLE SEAT CONTROL INTERFACE ASSEMBLY AND VEHICLE SEAT WITH RETRACTABLE SEAT CONTROL INTERFACE

FIELD OF THE INVENTION

The present invention relates to relates to vehicle seats in general and more particularly relates to a vehicle seat with a retractable control interface.

BACKGROUND OF THE INVENTION

Vehicle seats are known that include position adjustment features. Vehicle seats typically include a seat base (also known as a cushion) with a seatback (also known as a backrest) which can pivot relative to the seat base. The pivoting motion may be used to set a recline position between a seatback full upright position and a seatback full recline position. The fitting or recline pivot that controls the relative pivoting motion and sets the relative position may have a manual interface to set and fix the recline position of the seatback and to release the fixed position for adjustment. The recline pivot feature may also be motorized to provide a powered adjustment. A myriad of powered adjustment features may be provided to reposition the vehicle seat, for example with respect to a vertical direction (vehicles Z direction), lateral direction (vehicle Y direction), horizontal direction (vehicle X direction) as well as rotational aspects with regard to each of the directions (for example rotation of the vehicle seat about the vertical axis). The actuation interface to effect the position changes is often at a lower side of the vehicle seat. This is a somewhat typical configuration for a front driver seat and for a front passenger seat.

SUMMARY OF THE INVENTION

It is an object of the invention to provide an interface assembly and a vehicle seat with an interface, particularly a control/actuation interface, which is conveniently available for use but which is essentially hidden during non-use or at least does not detract from the aesthetic appearance of the overall vehicle seat.

It is a further object of the invention to provide an interface assembly and a vehicle seat with an interface which is ergonomically positioned and easily accessible and within the view of the occupant when needed and used by the occupant.

According to the invention a retractable interface assembly is provided comprising a base member defining a track and a track follower support member engaging the track and moving along the track between a retracted position and an extended position. A viewing angle detent mechanism pivotably connects an interface panel to the track follower support member and defines a plurality of angular positions of the interface panel relative to the track follower support member, including a storage angle position and a full up angle position, to fix the interface panel relative to the track follower support member in one of the plurality of angular positions. A position setting device sets a position of the track follower support member along the track of the base member. The set positions include the retracted position of the track follower support member along the track of the base member and the extended position of the track follower support member along the track of the base member.

The position setting device advantageously comprises a spring loading release mechanism configured to release the track follower support member from the retracted position and move the track follower support member along the track from the retracted position of the base member to the extended position along the track of the base member. The spring loading release mechanism is configured to releaseably hold the position of the track follower support member along the tracks of the base member.

The spring loading release mechanism may comprise a biasing device biasing the track follower support member into the extended position and a release mechanism holding the track follower support member in the retracted position and releasing the track follower support member from the retracted position, whereby the biasing device moves the track follower support member to the extended position. The release is advantageously effected by pressing a front surface of the interface panel to act on a resilient member of the release mechanism via the track follower support member. The biasing device may comprise a coil spring arrangement configured to move the track follower support member along the track of the base member to the retracted position. The coil spring arrangement may comprise a coil spring assembly connected to the base member and connected to the track follower support member for spring biasing the track follower support member to the retracted position.

The retractable interface assembly may advantageously further comprise a vehicle component part with a component body defining an interface receiving space and with a cover surface having an opening. The base member is received in the interface receiving space and is mounted to the vehicle component part. In the retracted position, the track follower support member and the interface panel are disposed in the interface receiving space. In the access position the interface panel is positioned outside the receiving space. The interface panel is moved out through the opening to move from the retracted position to the access position. The vehicle component part may be an armrest.

The interface panel may comprise a control interface with interface keys for inputting commands into the control interface. The interface panel may comprise a touch screen presenting the interface keys as softkeys. As an alternative or in addition, the interface panel may comprise a support tray for supporting a mobile device and a wireless charging facility for charging the supported mobile device.

According to another aspect of the invention, a vehicle seat is provided comprising a seat base, a backrest pivotably connected to the seat base and an armrest supported relative to the seat and seat base. A retractable seat interface assembly according to the invention is supported by the armrest.

The vehicle seat may advantageously include a positioning system comprising an actuator, a plurality of motors and an operative connection between the actuator and the plurality of drive motors, the plurality of motors comprising seatback pivot drive for changing a pivot angle of the seatback relative to the seat base between a seatback full upright position and a full recline position, wherein the interface panel comprises a control interface with interface keys for inputting commands to the actuator.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
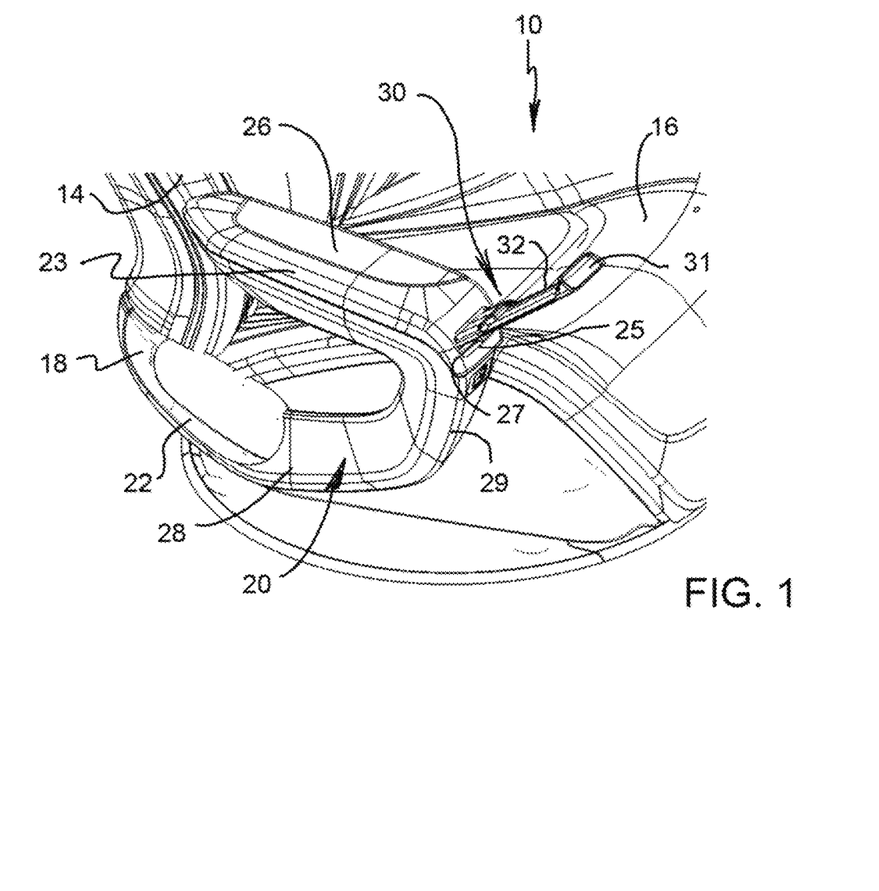
FIG. 1 is a partial perspective view of a vehicle seat according to an embodiment of the invention, showing an armrest with a retractable interface in an extended and pivoted up position.
Figure 2:
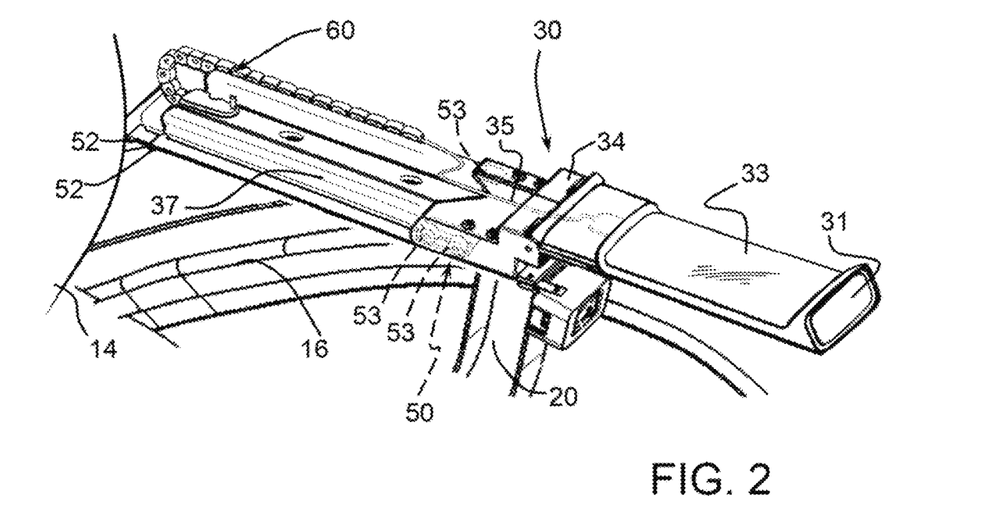
FIG. 2 is a partial perspective and detailed view showing the interface of FIG. 1, with some structural features of the armrest removed and with the retractable interface in the extended and pivoted down position.

Referring to the drawings, FIG. 1 shows a vehicle seat generally designated 10 that includes a seatback 14 that is pivotably connected to a seat base 16. The pivot connection is via a fitting, also known as recline pivot, which is designated 18. This configuration is provided such that the seatback 14 pivots relative to the seat base 16. The vehicle seat further includes armrests including an armrest 20. The armrest 20 has a pivot connection 22 connected to the recline pivot 18. The armrest 20 is fixed to the seatback 14 near the pivot 18 such that the seatback 14 and the armrest 20 pivot together as the seatback 14 is moved between a full recline position and a full upright position.

The vehicle seat 10 further includes an interface assembly, generally designated 30. The interface assembly 30 is fixed to the armrest 20 such that the interface assembly 30 pivots with the armrest 20 and with the seatback 14. However, the invention may be provided with the interface assembly 30 which is fixed to an armrest which is fixed relative to the seat base 16. Further, the invention is further directed to the interface assembly 30 that is fixed to another vehicle features such as an inner door surface or a vehicle console compartment. In the example shown the armrest 20 comprises an upper armrest body 23 defining an interface receiving space and with a cover surface having an opening 25. Another vehicle component part, such as a console may support the control interface assembly 30 with a component body defining an interface receiving space and with a cover surface having an opening.

The armrest 20 includes a pivot connection 22, connecting the armrest 22 the recline pivot 18. Further details of the armrest 20 has a pivot connection 22 connected to the recline pivot 18 are disclosed in the attached patent application entitled VEHICLE SEAT WITH ARMREST which is incorporated by reference herein in its entirety. The armrest includes an upper armrest portion 23 that defines an armrest upper surface 26 and defining the interface receiving space. The upper armrest portion 23 connects via an armrest joining portion 29 to the armrest lower portion 28. The upper armrest portion 23 has an armrest upper forward end 27 with the opening 25. The interface assembly 30 includes an interface panel 32 which extends out of the opening 25 to an extended position for use. In a non-use position or retracted position, the interface panel 32 is retracted into the upper armrest portion 23 and a front surface 31 of the interface panel 32 essentially closes the opening 25.

Figure 11:
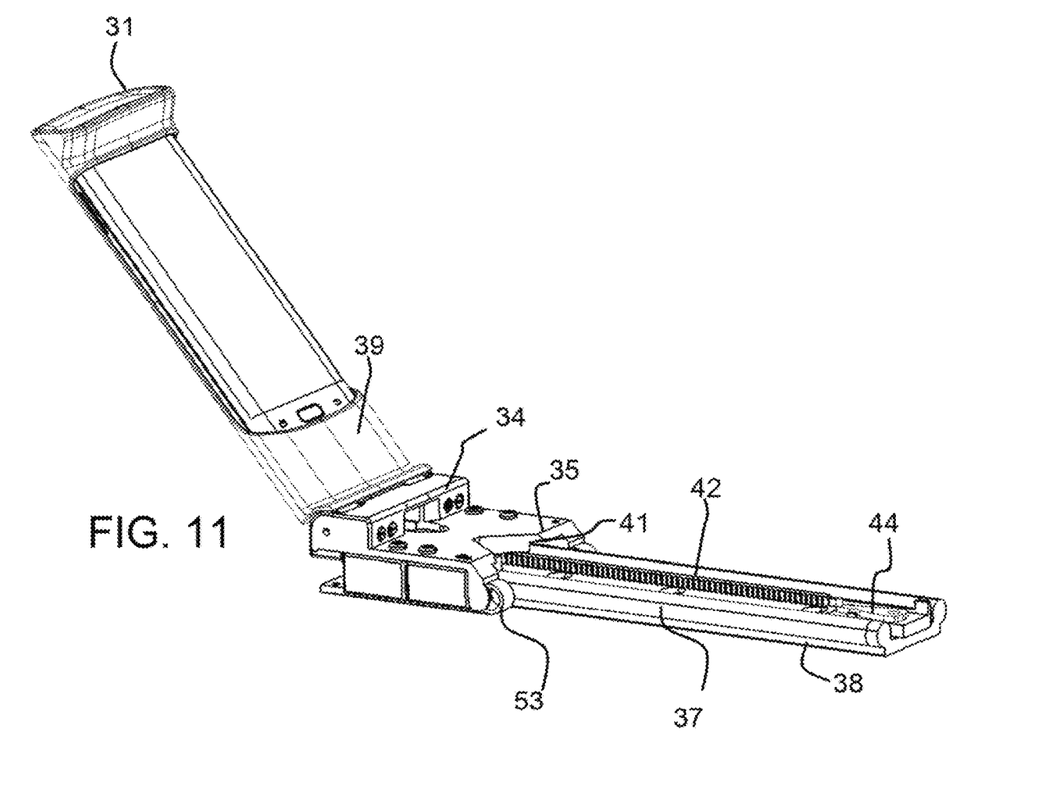
FIG. 11 is a perspective view of the retractable interface assembly, showing the interface panel in a pivoted up position.

The interface panel 32 includes an interface surface 33. The surface 33 includes a touchscreen with display content controlled by a processor 90, discussed below. Other types of interfaces may be provided including a fixed display with fixed entry keys. However, it is believed that a display which can be changed, and which presents changeable soft keys (regions of the touchscreen which can be actuated) presents significant advantages. The interface panel 32 is connected by a viewing angle detent mechanism 34 to a track follower support member 35. The track follower support member 35 includes track engaging parts 41 which positively engage in two tracks 37 of a base track member 38 (FIG. 11). The track engaging parts 41 of the track follower support member 35 move along the tracks 37 of the base member 38 to position the support member 35 in a retracted position (FIGS. 4 and 5) and in the extended position (FIGS. 1-3 and 6).

Figure 3:
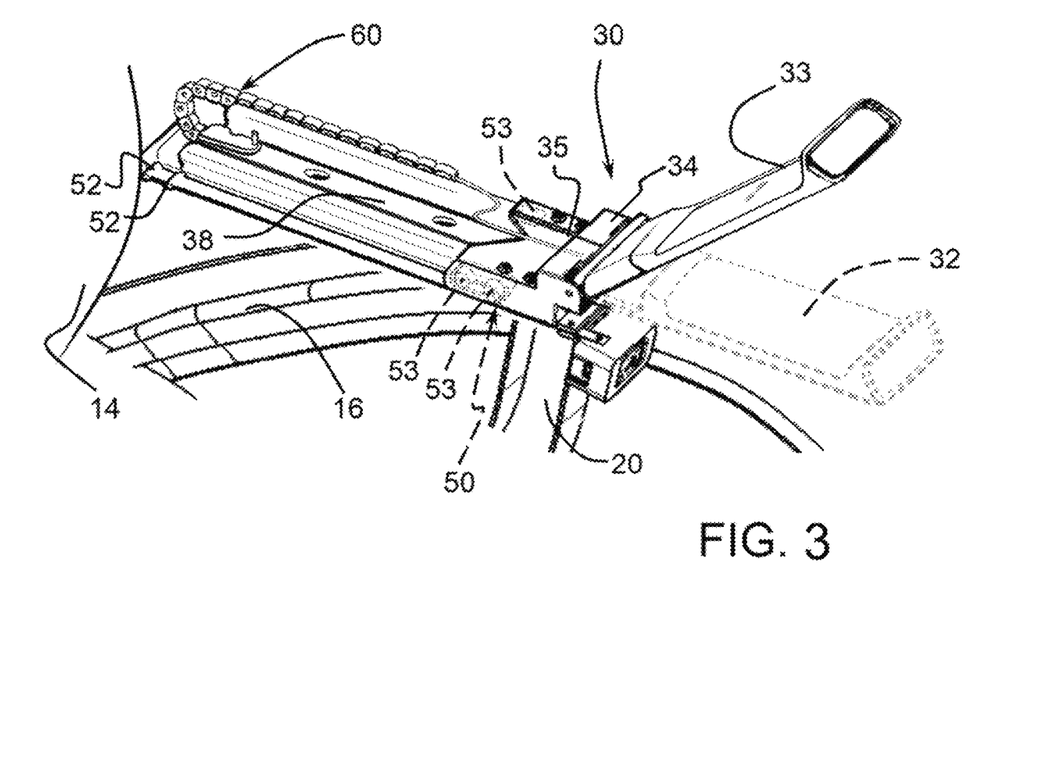
FIG. 3 is a partial perspective and detailed view, similar to FIG. 2, showing the retractable interface in the extended and pivoted up position and in dashed line showing the retractable interface in the extended and pivoted down position.
Figure 4:
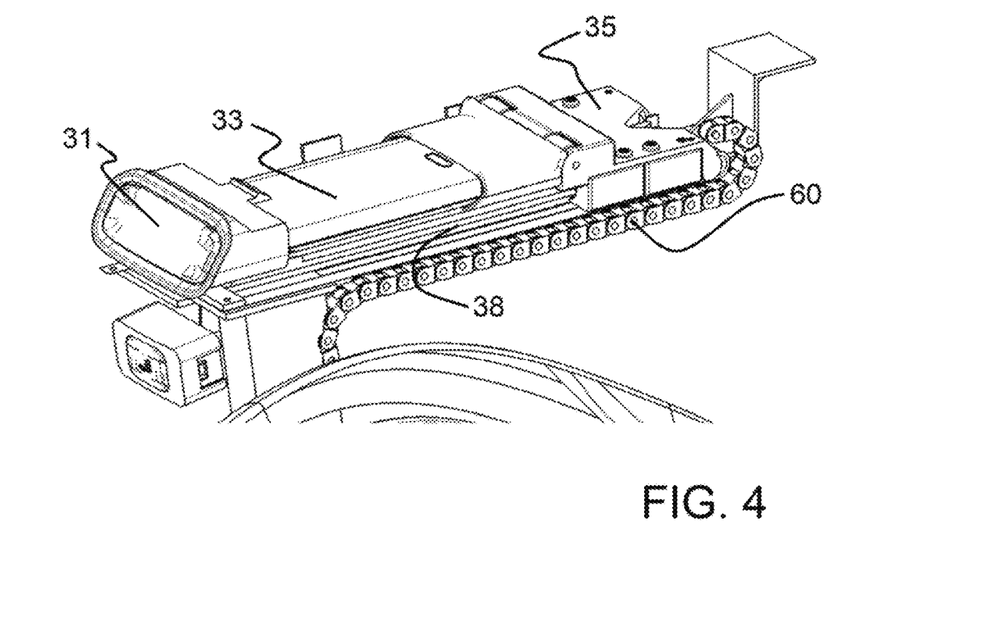
FIG. 4 is a partial perspective and detailed view showing the retractable interface in a retracted position.
Figure 5:
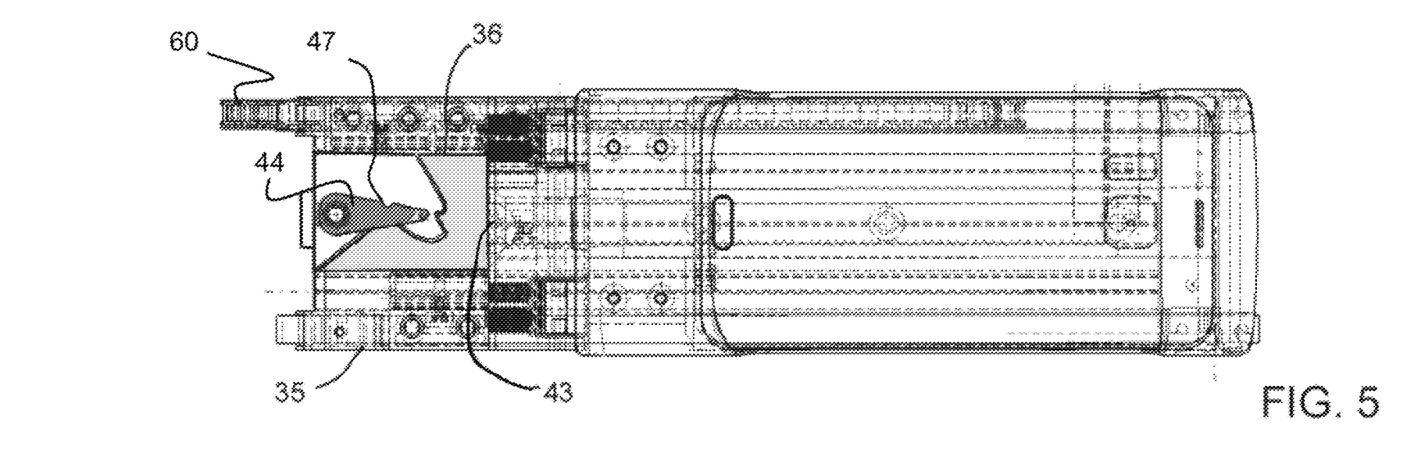
FIG. 5 is a top view of the retractable control interface, showing the interface in a retracted position.
Figure 6:
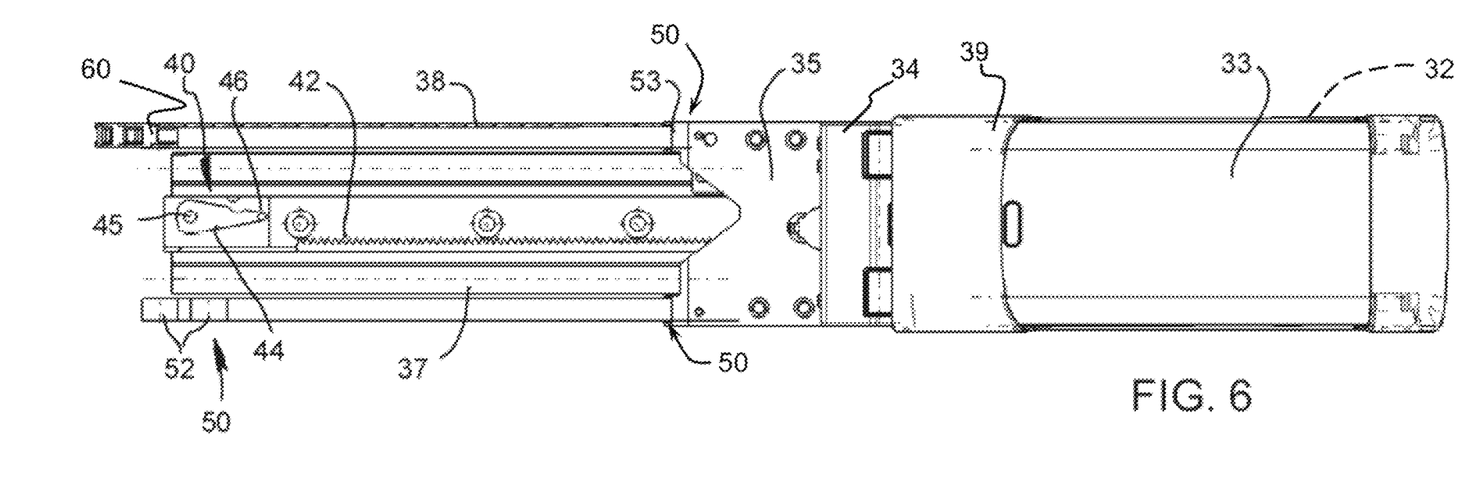
FIG. 6 is a top view of the retractable control interface, showing the retractable interface in an extended position.

In the extended position, the interface panel 32 can be angled into any one of a plurality of fixed positions. The position of the interface panel 32 is set by the viewing angle detent mechanism 34. This facilitates use of the interface panel 32 and allows for an adjustment of a viewing angle of the interface panel 32 for viewing the touch screen display of the interface panel 32. FIGS. 1 and 3 show the interface panel 32 angled up to an angle selected for use. The base member 38 is received in the interface receiving space of the upper armrest portion 23 and is mounted to the armrest 20 as the vehicle component part. FIGS. 3 and 4 show the interface panel 32 angled down. FIG. 4 shows the retracted position in which the track follower support member 35 and the interface panel are disposed in the interface receiving space, namely within the cover of the upper armrest portion 23. In the extended or access position the interface panel is positioned outside receiving space (FIG. 3) and may be pivoted into a use position (FIG. 3). The interface panel 32 is moved out through the opening to move from the retracted position to the access position.

The assembly 30 includes a resilient release mechanism 40 that interacts with the support member 35 and is configured to releaseably hold the position of the track follower support member 35 along the tracks 37 of the base member 38. This sets the support member 35 in the retracted position and releases the track follower support member 35 for movement along the track 37. The release mechanism 40 includes a resilient latch 44 that has a cup shape feature to hold a position of the support member 35 until force is applied to the front surface 31 of the interface panel 32. This force acts to move the control surface 36 of support member 35 so as to act on the engaging stop 46 to activate the release mechanism 40. This allows coil springs 53 of a biasing device with coil spring arrangement 50 to unwind so as to push the support member 35 to the access position. The release mechanism 40 and the of a biasing device 50 together form a position setting device, which sets a position of the track follower support member 35 along the track 37 of the base member 38, including setting the retracted position of the track follower support member 35 and setting the extended position of the track follower support member 35. The release mechanism 40 is a spring loaded release configured to move the track follower support member 35 along the tracks 37 from the retracted position of the base member 38 to the extended position along the tracks 37 of the base member 38. With this configuration a user can press the front surface 31 of the panel 32, which results in the control surface 36 of track follower support member 35 engaging stop 46 to deflect resilient latch 44 and activate the release mechanism 40 that releases the support member 35 to the extended access position.

The coil spring arrangement 50 includes three coil springs 53 supported by track follower support member 35. In the assembly 30 of the embodiments shown, two coil springs 53 are at one side and with ends supported by the base member 38 at connections 52. Another coil springs 53 is supported by track follower support member 35 and extends to an end 52 at the opposite side of the base member 38. In the retracted position of the track follower support member 35 the coil spring 53 are retracted (see FIG. 5). In the extended position of the track follower support member 35, the coil spring 53 are extended (see FIG. 6). With this configuration, the coil spring arrangement 50 spring biases the track follower support member 35 to the extended access position.

The track engaging parts 41 and the tracks 37 comprise a nylon bushing track. The coil spring arrangement 50 with the multiple coil springs 53 is particularly robust and provides significant force between the support member 35 and the base member 38 upon release by the release mechanism 40. To regulate the movement of the track follower support member 35, a fluid viscous damper arrangement is provided with a rotationally damped pinion 43 at the support member 35. The pinion 43 engages a rack 42 supported by the base member 38. This regulates the movement of the support member 35 along the tracks 37 as the support member 35 is released from the retracted position.

The assembly 30 includes a cord management arrangement generally designated 60. The cord management arrangement 60 is configured to be supported by the arm 20 for movement along a path with the movement of the support member 35 along the tracks 37. The cord (wire) management arrangement 60 provides an electrical connection (shown schematically in dashed line in FIG. 2) to the interface panel 32. This provides a power connection to the interface panel 32 as well as a processor connection 97 to a processor 90. The cords/wires/cable(s) extend with the cord management arrangement 60 to at least one slack length region to accommodate the movement of the cord management arrangement 60 and extend to region of the pivot connections 22, from which they extend to or are connected to cords and cables of powered positioning system 80.

Figure 7:
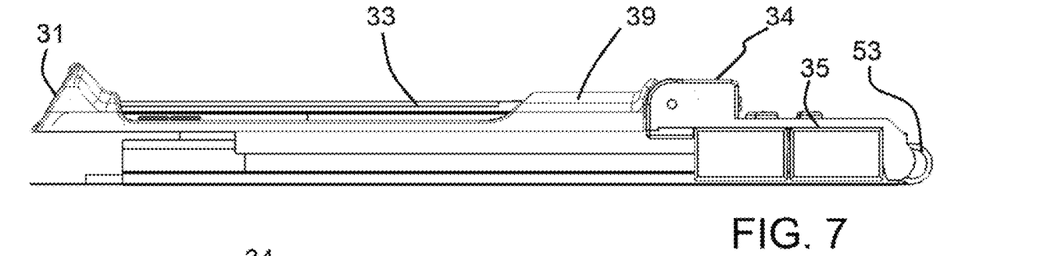
FIG. 7 is a side view showing parts of a retractable interface assembly.
Figure 8:
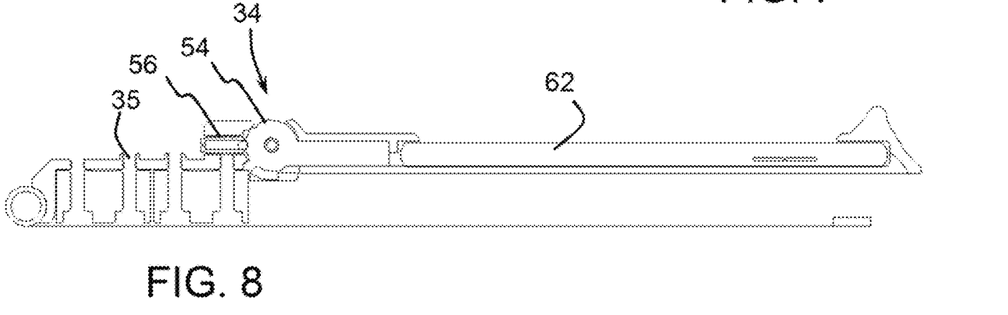
FIG. 8 is a cross-sectional view of the retractable interface assembly.
Figure 9:
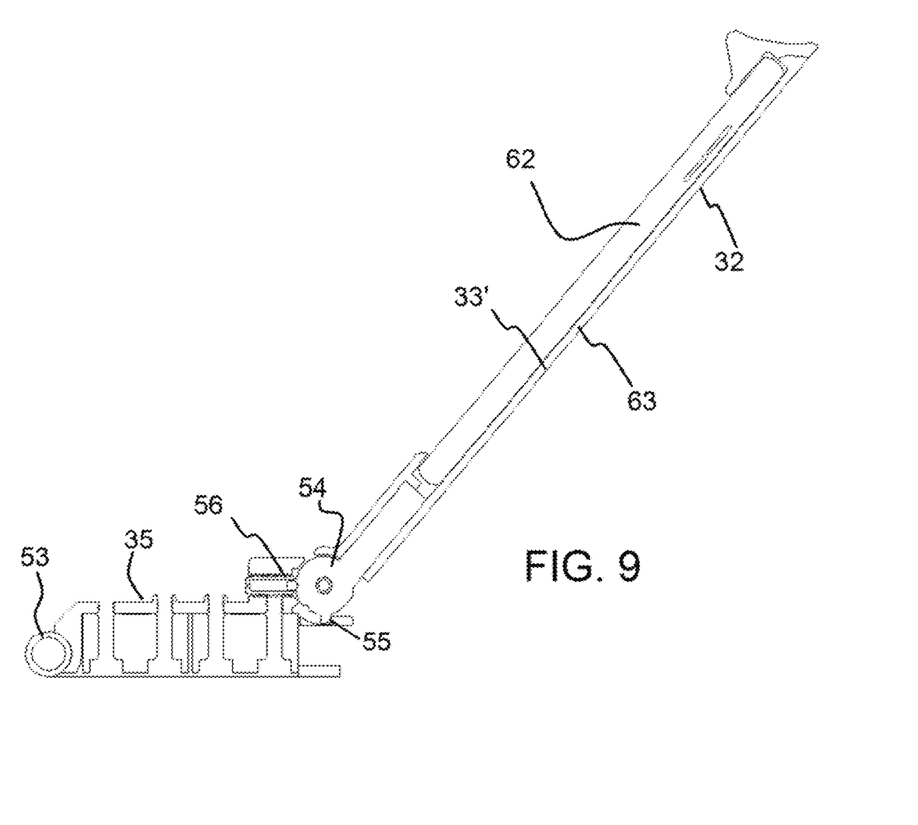
FIG. 9 is a cross-sectional view of the retractable interface assembly, showing the interface panel in a pivoted up position.
Figure 10:
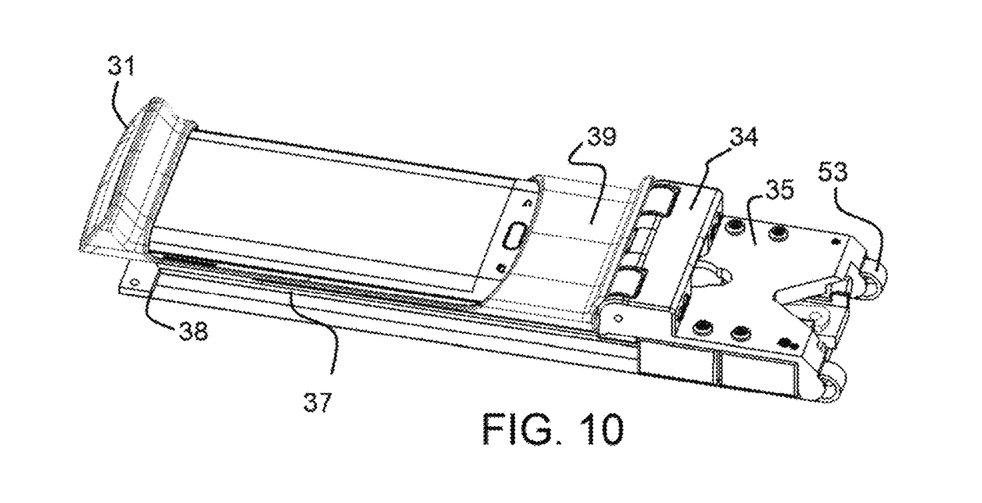
FIG. 10 is a perspective view of the retractable interface assembly, showing the interface panel in a pivoted down position.

FIGS. 7-9 shows particular aspects of the support member 35 and the connection to the interface panel 32 via the detent mechanism 34. The detent mechanism 34 includes a pivot 54 with a detent pin engaging surface. The engaging surface has teeth with essentially rounded tips and intermediate troughs and an essentially smooth transition between the tips and intermediate troughs. This allows a spring loaded detent pin 56 to engage a trough to hold an angular position of the interface panel 32 relative to the support member 35. The engaging surface cooperates with a spring force applied to the spring-loaded detent pin 56 to set forces for adjusting and setting the angular position of the interface panel 32. The engaging surface at pivot 54 further includes a stop portion 55 to interact with a support portion of the detent mechanism 34 to set the pivoted down position and the pivoted full up position. The interface panel 32 is shown with the interface surface 33' as a tray with a tray device support 39 and supporting a mobile device/phone 62. In FIG. 9, the interface surface 33' is shown having a touch screen display and/or wireless charging facility 63.

The interface panel 32 is particularly and advantageously useful for the input of commands from the occupant of the vehicle seat to actuate the powered positioning system 80. However, the interface panel 32 may have an infinite number of display screens for touch screen display of the front surface 33. For example, the touchscreen of the front surface 33 can provide a gaming interface for games viewed on the display of surface 33. The touch screen display of the front surface 33 may provide an interface to other features of the vehicle including for example sound provided by Wi-Fi or Bluetooth interface or other control or entertainment features. The interface panel 32 advantageously forms a device tray with a wireless charging facility 63 (FIG. 9) for a mobile device/phone 62. The interface panel 32 may also provided one or more jacks or connection interfaces, such as USB, minijack, etc, for a power/data connection.

Figure 12:
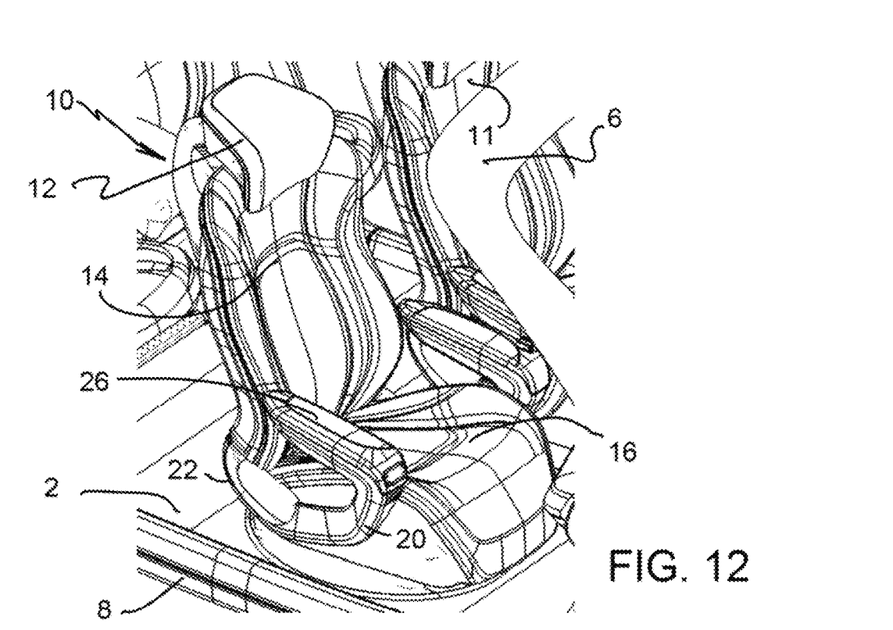
FIG. 12 is a perspective view showing the vehicle seat as a front passenger seat of a vehicle.

The interface panel 32 with the built in touch screen presents one or move interface screens used as an actuator input interface 82 of a powered positioning system 80. The vehicle seat 10 is provided with numerous options for changes in position. FIG. 12 shows the vehicle seat 10 positioned at a vehicle floor 2 of a vehicle 8. The vehicle seat 10 is shown facing a travel direction (with regard to a front windshield frame 6), and is shown as a passenger front seat of an automobile. However, an identical seat, as a driver seat 11, could also be provided. The vehicle seat 10 is further not limited to automobiles.

Figure 13:
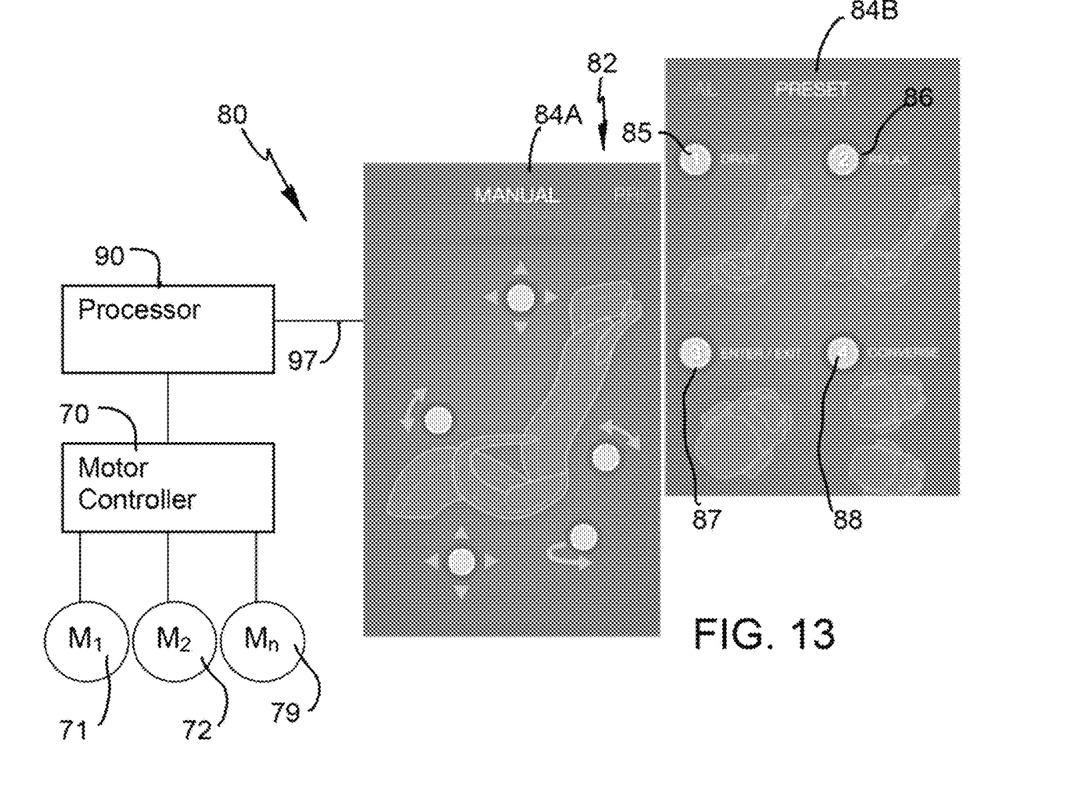
FIG. 13 is a schematic view showing features of a powered vehicle seat positioning system.

FIG. 13 schematically shows aspects of the powered positioning system 80.

The positioning system 80 includes the plurality of drive motors 71 ($M_1$), 72 ($M_2$)-79 ($M_n$) effecting the position changes. The position system 80 includes an actuator 82 with an actuator human interface 84A and 84B provided by the touch display of the surface 33 of interface panel 32 or by the mobile device 62. The actuator 82 includes the control interface panel 32 with touch display that is built into the armrest 20. The interface panel 32 has the electrical (data/power) connection 60 which extends through the intermediate portion of the armrest 29 and lower portion 28 to an electrical connection near the recline pivot 18. The actuator 82 with actuator interface or control interface 84A, 84B is connected via the processor connection 97 to the processor 90 or the like. The processor 90 both controls the display content of the interface 84A, 84B and also receives signals from the interface to control the motors 71 (M$_1$), 72 (M$_2$)-79 (M$_n$) via motor controller 70. The processor connection 97, the processor 90 and the motor controller 70 present just one example of an operative connection between the actuator the plurality of drive motors 71 (M$_1$), 72 (M$_2$)-79 (M$_n$). With the human interface 84A and 84B provided by the mobile device 62, the processor connection 97 may be via a bluetooth connection between the mobile device 62 and the processor 90.

Interface 84A shows the interface in a manual mode, wherein each position adjustment may be selected, including rotation of the vehicle seat 10. The interface 84A allows the occupant to select a changeover to the interface 84B. The interface 84B allows a selection of preset movements to preset positions. In particular, sequenced sets of specified seat movements via movement actuators 85, 86, 87 and 88 are provided that rotate and position the vehicle seat 10 for getting in and out of the vehicle 8 easier. Instead of the panel 32 being an interface or in addition to the panel 32 being an interface, the panel 32 forms a mobile phone/mobile device charging location. In this case the panel 32 also has the device support 39 for positioning and supporting a mobile device/phone 62 relative to a wireless charging facility 63. The panel 32 may also include wire connection ports such as a minijack or a USB port.

Figure 14:
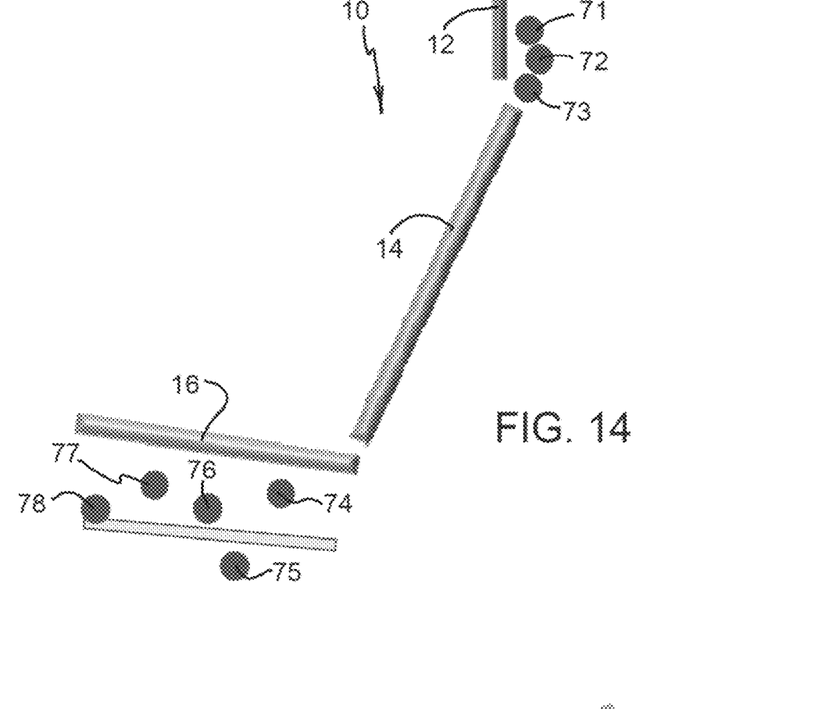
FIG. 14 is a schematic view of the vehicle seat of FIG. 1, including various position adjustment motors.
Figure 15A:
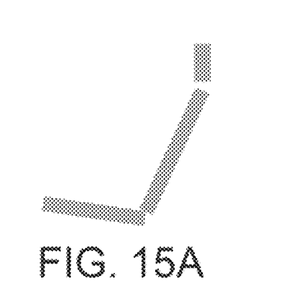
FIG. 15A is schematic view showing seat position aspects of a seat design position for a first memory mode.
Figure 15B:
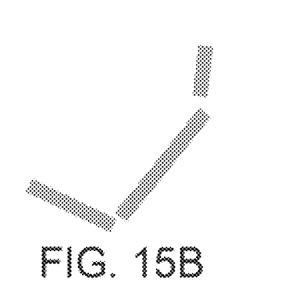
FIG. 15B is schematic view showing seat position aspects of a relax-deep recline position for a second memory mode.
Figure 15C:
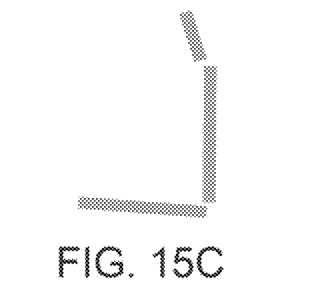
FIG. 15C is schematic view showing seat position aspects of a stow position for a third memory mode.
Figure 15D:
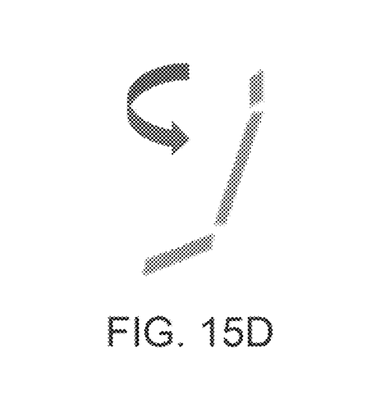
FIG. 15D is schematic view showing seat position aspects of a enter/exit-ingress/egress position for a fourth memory mode.
Figure 15E:
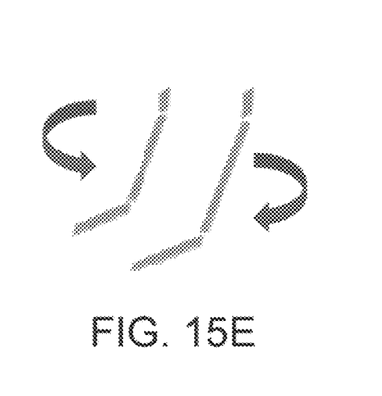
FIG. 15E is schematic view showing seat position aspects of a converse position for a fifth memory mode.

The vehicle seat 10 advantageously includes the plurality of motors 71-79, each for effecting a different positional change. As schematically shown in FIG. 14, the vehicle seat 10 includes a position adjustment motor 71, a Z/height position adjustment motor 72 and a tilt angle adjustment motor 73 for the headrest assembly 12. Additionally, a recline motor 74, a swivel (Z-axis rotation) motor 75, a four-aft track motor 76, a seat base tilt angle motor 77 and a lift (up down) motor 78 are provided. The interface panel 32 may be used to select pre-memorized seat position modes. This may be based on the vehicle seat 10 having a memorized design position (FIG. 15A) with positioning ranges. This may be a design position at a design tilt of 25 degrees. The design position has a lift range—down 3.8 mm and up 44 mm with a recline range—rearward 20 degrees upright 10 degrees, a track range—rearward 50 mm forward 160 mm of travel rotation—15 degrees in an inboard direction and 70 degrees in an outboard direction and with headrest travel from a design position 40 mm up and 50 mm forward. FIG. 15 B shows a second memorized position—a deep recline position. This has the tilt full up, a lift in any position, a recline of 50°, any track position, a rotation angle of zero (forward) and with the headrest forward. FIG. 15 C shows a memorized stow position with the tilt full down, the lift full down, the recline full forward, the track full forward, the rotation at full forward and the headrest in the design position. FIG. 15 E shows an ingress/egress memory position which is actuated from any initial position to rotate the vehicle seat 10 to a position with the tilt full down, the lift in the design position. The end ingress/egress position has the recline in the design position, the track full forward, the rotation at 70° in the outbound direction in the headrest in the design position. FIG. 15 E shows a conversation memory position in which seats are rotated towards each other. This may be for example based on each vehicle seat rotating 15° in an inbound direction. Preferably each of the adjustments such as manual adjustments and preset movements and positioning are provided by an occupant using the touchscreen at the surface 33 of the interface panel 32.

While specific embodiments of the invention have been shown and described in detail to illustrate the application of the principles of the invention, it will be understood that the invention may be embodied otherwise without departing from such principles.

APPENDIX I

List of Reference Characters 2 vehicle floor
4 direction of travel
5 horizontal
6 windshield frame
8 vehicle
10 vehicle seat
12 headrest assembly
14 seatback
16 seat base (cushion)
18 seatback recline pivot
20 armrests
22 pivot connection
23 armrest upper portion
25 opening
26 armrest upper surface
27 armrest upper forward end
28 armrest lower portion
29 joining portion
30 control interface assembly
31 front surface
32 interface panel
33 interface surface with touch screen display
33 interface surface with touch screen display and/or wireless charging facility
34 viewing angle detent mechanism
35 track follower support member
36 control surface
37 tracks
38 base member
39 Tray device support
40 coil springs
41 track engaging parts
42 rack
43 engaging pinion
44 stop latch
45 stop latch pivot
46 engaging stop
47 release cup
50 biasing device with coil spring arrangement
52 coil spring end/supported connection
53 coil spring
54 pivot with engaging surface
55 stop portion
56 spring loaded detent pin
60 cord (wire) management arrangement
62 Smartphone
63 wireless charging facility
64 power/data connection
70 Motor control
71 headrest X position adjustment motor
72 headrest Z position adjustment motor
73 headrest tilt angle adjustment motor
74 recline motor
75 swivel (z-axis rotation) motor
76 four-aft track motor 77 seat base tilt angle motor
78 lift (up down) motor
79 nth motor or armrest pivot motor
80 positioning system
82 actuator
85 movement actuator
86 movement actuator
87 movement actuator
88 movement actuator
90 processor
97 processor connection

What is claimed is:

1. A retractable interface assembly comprising:
   a base member defining a track;
   a track follower support member engaging the track and moving along the track between a retracted position and an extended position;
   an interface panel;
   a viewing angle detent mechanism pivotably connecting the interface panel to the track follower support member and defining a plurality of angular positions of the interface panel relative to the track follower support member, including a storage angle position and a full up angle position, to fix the interface panel relative to the track follower support member in one of the plurality of angular positions; and
   a position setting device, setting a position of the track follower support member along the track of the base member, including setting the retracted position of the track follower support member along the track of the base member and releasably holding the track follower support member in the retracted position and setting the extended position of the track follower support member along the track of the base member.

2. A retractable interface assembly according to claim 1, wherein the position setting device comprises a spring loading release mechanism configured to release the track follower support member from the retracted position and move the track follower support member along the track from the retracted position of the base member to the extended position along the track of the base member.

3. A retractable interface assembly according to claim 2, wherein the spring loading release mechanism comprises:
   a biasing device biasing the track follower support member into the extended position; and
   a release mechanism providing the releasable holding of the track follower support member in the retracted position and releasing the track follower support member from the retracted position, whereby the biasing device moves the track follower support member to the extended position.

4. A retractable interface assembly according to claim 3, wherein the biasing device comprises a coil spring arrangement configured to move the track follower support member along the track of the base member to the retracted position.

5. A retractable interface assembly according to claim 4, wherein the coil spring arrangement comprises a coil spring assembly connected to the base member and connected to the track follower support member for spring biasing the track follower support member to the retracted position.

6. A retractable interface assembly according to claim 4, further comprising a vehicle component part with a component body defining an interface receiving space and with a cover surface having an opening, wherein:
   the base member is received in the interface receiving space and is mounted to the vehicle component part;
   in the retracted position, the track follower support member and the interface panel are disposed in the interface receiving space;
   in the access position the interface panel is positioned outside the receiving space; and
   the interface panel is moved out through the opening to move from the retracted position to the access position.

7. A retractable interface assembly according to claim 6, wherein the vehicle component part is an armrest.

8. A retractable interface assembly according to claim 1, wherein the interface panel comprises a control interface with interface keys for inputting commands into the control interface.

9. A retractable interface assembly according to claim 1, wherein the interface panel comprises a touch screen presenting the interface keys as softkeys.

10. A retractable interface assembly according to claim 1, wherein the interface panel comprises a support tray for supporting a mobile device and a wireless charging facility for charging the supported mobile device.

11. A vehicle seat comprising:
    a seat base;
    a backrest pivotably connected to the seat base;
    an armrest supported relative to the seat and seat base; and
    a retractable seat interface assembly supported by the armrest, the retractable interface assembly comprising:
    a base member defining a track;
    a track follower support member engaging the track and moving along the track between a retracted position and an extended position;
    an interface panel;
    a viewing angle adjustment mechanism pivotably connecting the interface panel to the track follower support member; and
    a position setting device, setting a position of the track follower support member along the track of the base member, including setting the retracted position of the track follower support member along the track of the base member and releasably holding the track follower support member in the retracted position and setting the extended position of the track follower support member along the track of the base member.

12. A vehicle seat according to claim 11, wherein the position setting device comprises a spring loading release mechanism configured to release the track follower support member from the retracted position and move the track follower support member along the track from the retracted position of the base member to the extended position along the track of the base member.

13. A vehicle seat according to claim 12, wherein the spring loading release mechanism comprises:
    a biasing device biasing the track follower support member into the extended position; and
    a release mechanism holding the track follower support member in the retracted position and releasing the track follower support member from the retracted position, whereby the biasing device moves the track follower support member to the extended position.

14. A vehicle seat according to claim 13, wherein the biasing device comprises a coil spring arrangement configured to move the track follower support member along the track of the base member to the retracted position.

15. A vehicle seat according to claim 14, wherein the coil spring arrangement comprises a coil spring assembly connected to the base member and connected to the track follower support member for spring biasing the track follower support member to the retracted position.

16. A vehicle seat according to claim 11, wherein:

the viewing angle adjustment mechanism comprises a viewing angle detent mechanism defining a plurality of angular positions of the interface panel relative to the track follower support member, including a storage angle position and a full up angle position, to fix the interface panel relative to the track follower support member in one of the plurality of angular positions;

the armrest comprises an upper armrest body defining an interface receiving space and with a cover surface having an opening, wherein:

the base member is received in the interface receiving space and is mounted to the armrest;

in the retracted position, the track follower support member and the interface panel are disposed in the interface receiving space;

in the access position the interface panel is positioned outside the receiving space; and the interface panel is moved out through the opening to move from the retracted position to the access position.

17. A vehicle seat according to claim 11, further comprising a positioning system comprising an actuator, a plurality of drive motors and an operative connection between the actuator and the plurality of drive motors, the plurality of drive motors comprising seatback pivot drive for changing a pivot angle of the seatback relative to the seat base between a seatback full upright position and a full recline position, wherein the interface panel comprises a control interface with interface keys for inputting commands to the actuator.

18. A vehicle seat according to claim 17, wherein the interface panel comprises a touch screen presenting the interface keys as softkeys.

19. A vehicle seat according to claim 11, wherein the interface panel comprises a support tray for supporting a mobile device and a wireless charging facility for charging the supported mobile device.

20. A retractable interface assembly comprising:

a base member defining a track;

a track follower support member engaging the track and moving along the track between a retracted position and an extended position;

an interface panel;

viewing angle detent mechanism pivotably connecting the interface panel to the track follower support member and defining a plurality of angular positions of the interface panel relative to the track follower support member, including a storage angle position and a full up angle position, to fix the interface panel relative to the track follower support member in one of the plurality of angular positions; and a position setting device, setting a position of the track follower support member along the track of the base member, including setting the retracted position of the track follower support member along the track of the base member and setting the extended position of the track follower support member along the track of the base member, wherein the position setting device comprises a spring loading release mechanism configured to release the track follower support member from the retracted position and move the track follower support member along the track from the retracted position of the base member to the extended position along the track of the base member.

\* \* \* \* \*